Patented July 15, 1941

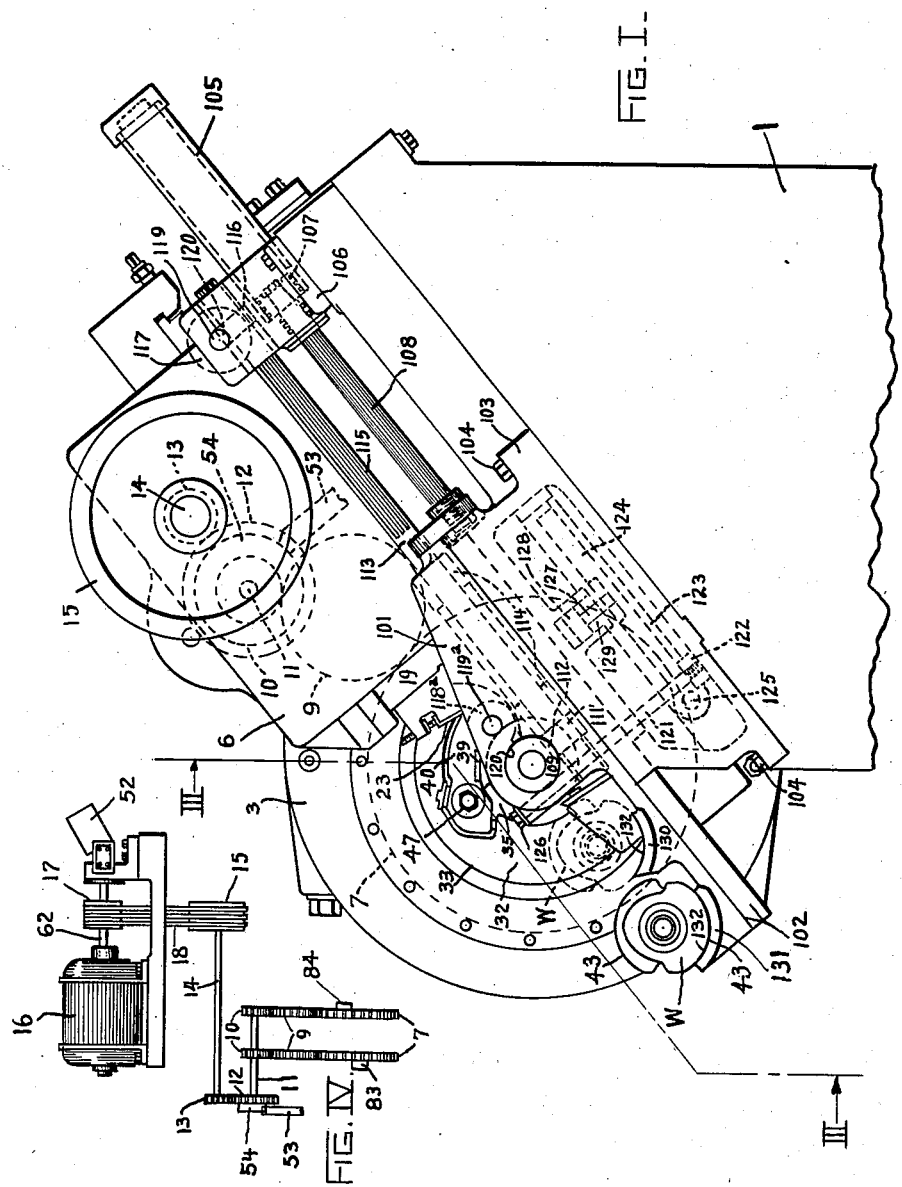

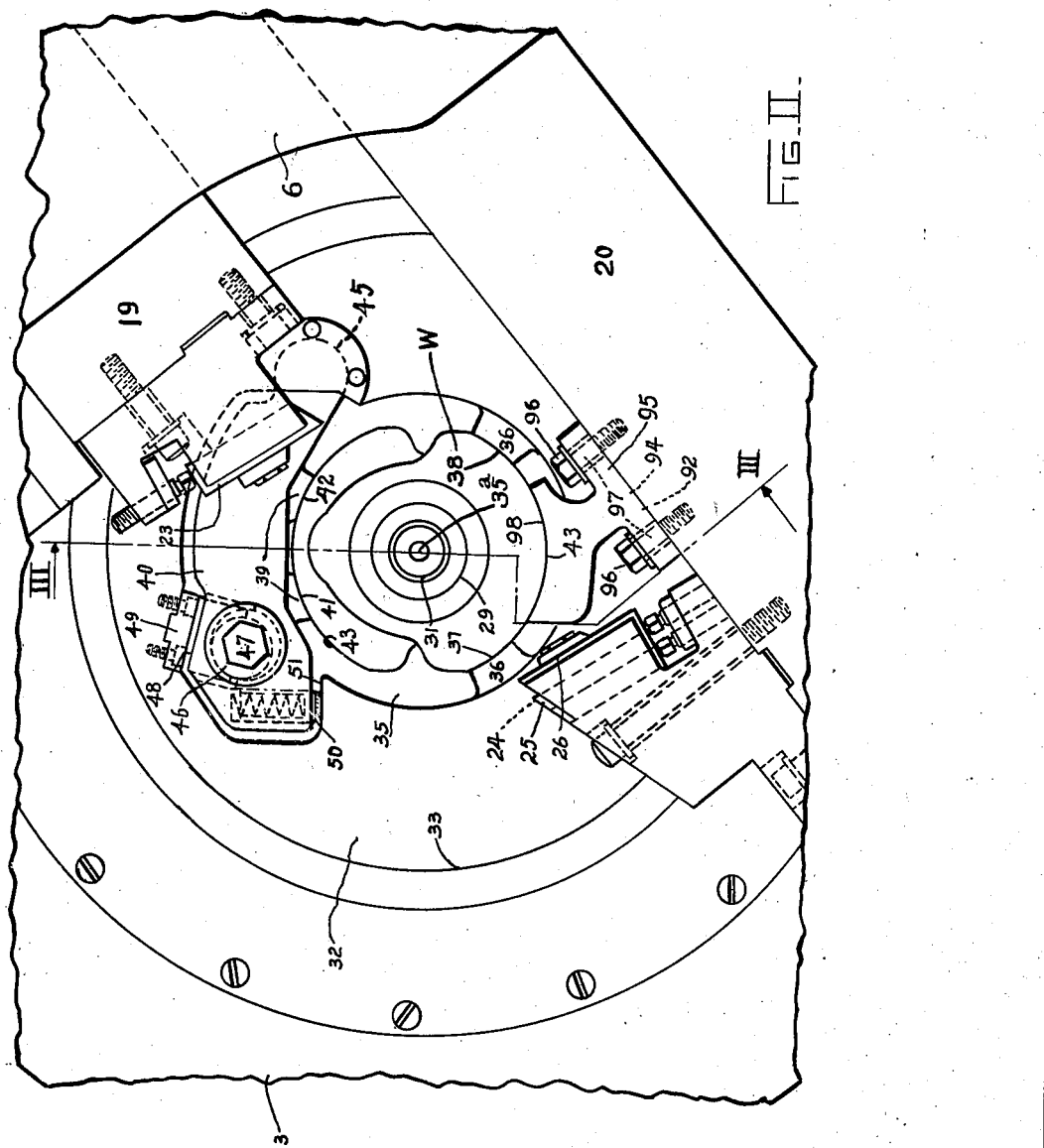

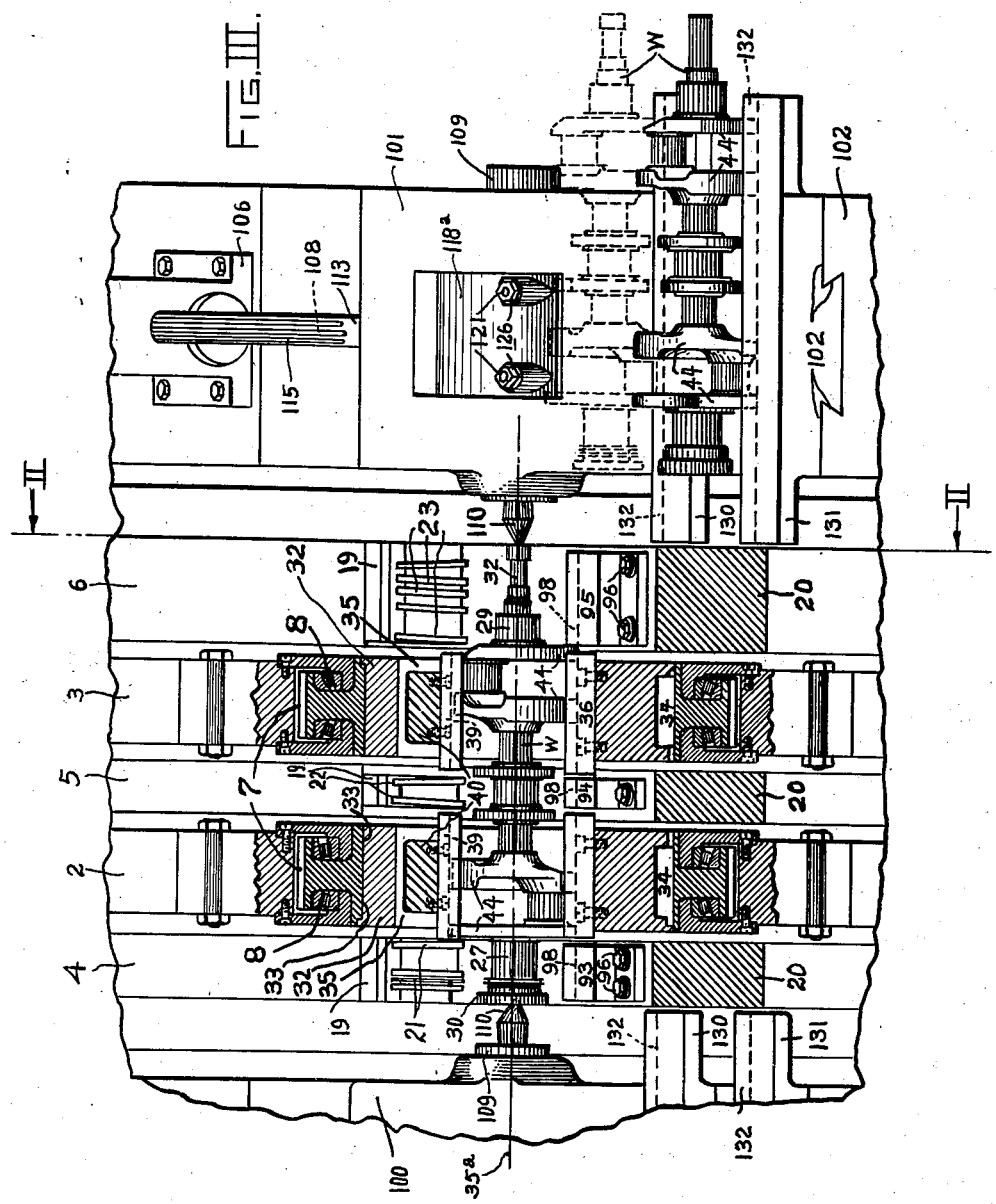

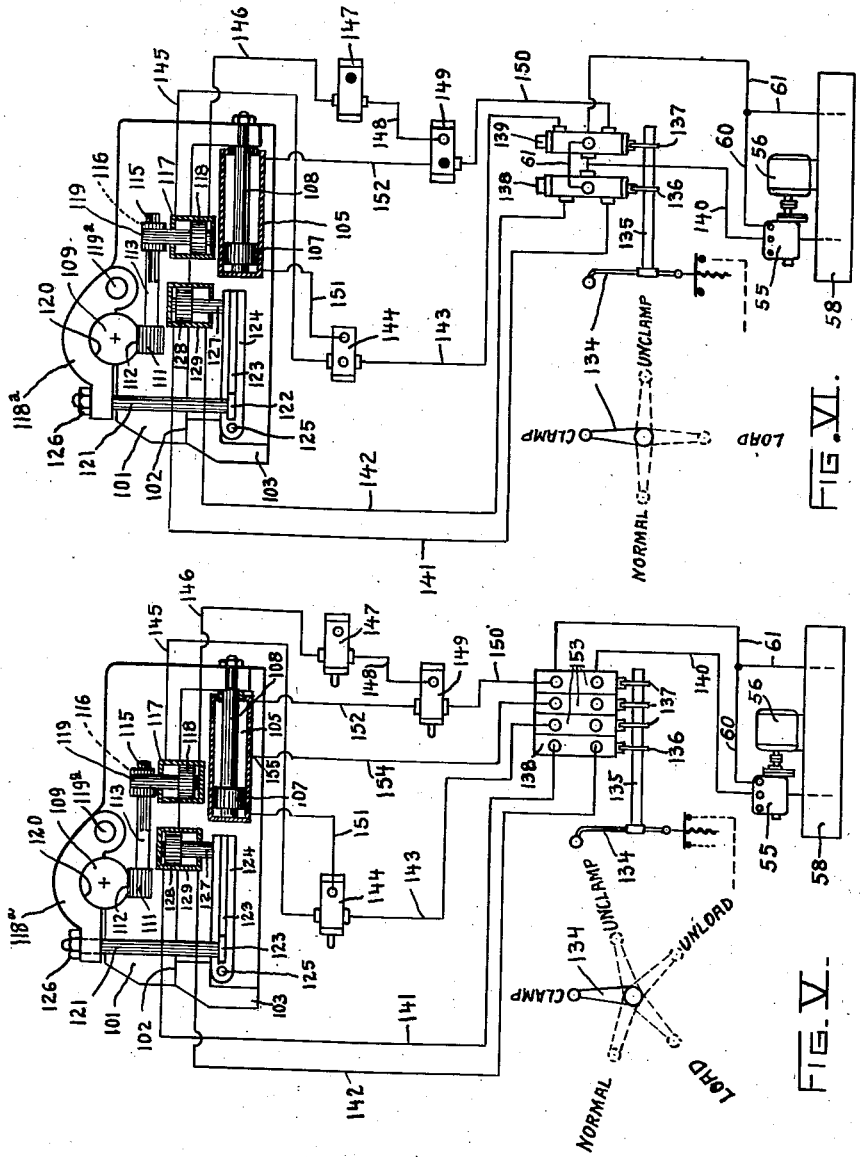

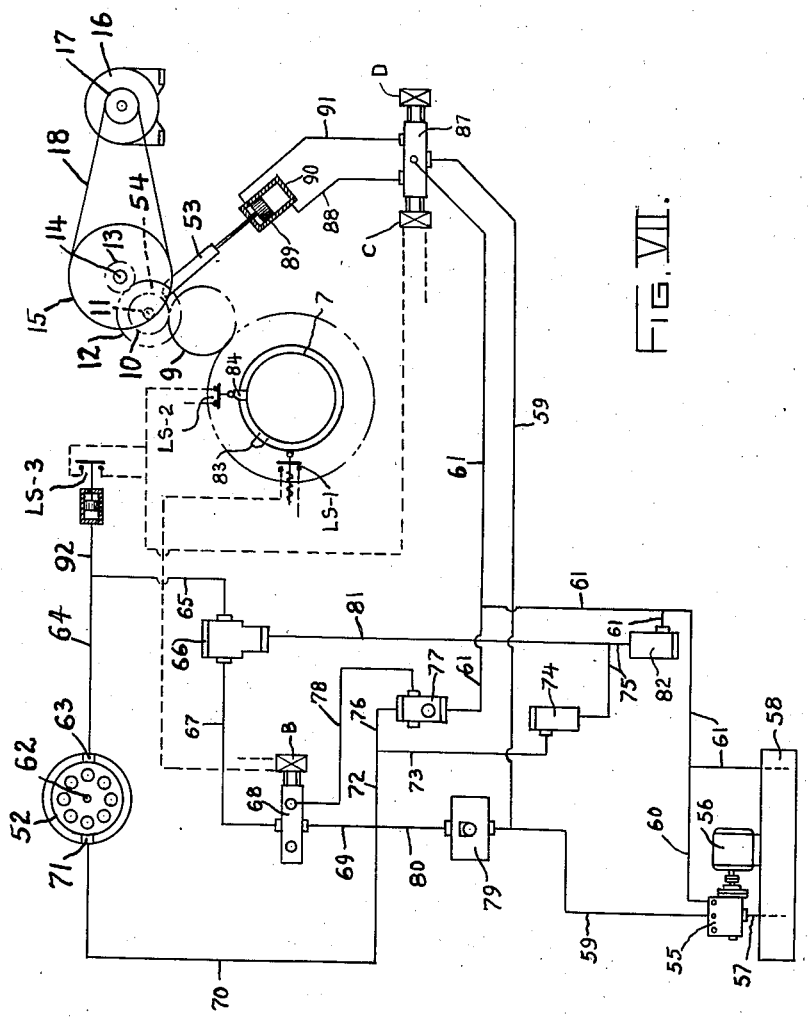

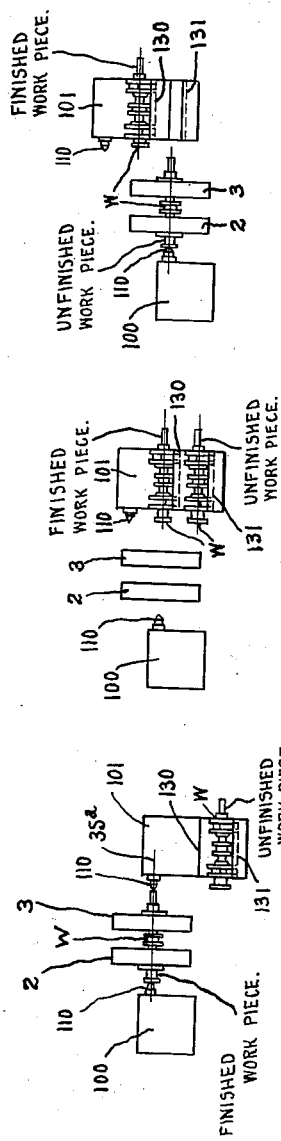

2,249,241

UNITED STATES PATENT OFFICE 2,249,241

WORK HANDLING MECHANISM

William F. Groene and Walter R. Meyer, Cincinnati, Ohio, assignors to The R. K. LeBlond Machine Tool Company, Cincinnati, Ohio, a corporation of Delaware Application June 26, 1940, Serial No. 342,554

29 Claims. (Cl. 82—1)

This invention pertains to loading and unloading of work in machine tools and is particularly related to crankshaft lathes of the center drive type of a character shown in Patent 2,069,107 dated January 26, 1937, in which the crankshaft to be machined is chucked and rotated by means of one or more center drive chucks and has its ends supported by centers while cutting tools operate on the various bearing portions of said crankshaft.

Heretofore in lathes of this character it has always been a major difficulty to provide proper means to load and unload the crankshaft into the center drive chucks. One difficulty has been that caused by the tailstock each side of the center drive chucks which prevented the insertion and removal of the work in the center drive chuck on the axis of rotation of the chuck and crankshaft. In order to avoid moving the tailstocks it was found necessary to make the center drive gears relatively large in diameter, in fact so large as to make the machine difficult to operate as these large center drive gears necessitated large housings which projected outwardly to the front of the machine and interfered with the operator's access to the cutting tools and chucking mechanism in the ring gears. In fact these ring gears became so large in instances where loading devices were used that it was practically impossible for the operator to get at certain of the tools, for example the cutting tools 22 on the tool bar 19, and also difficulty was found in gaining access to the various clamping devices in the ring gear chucks. Another defect of the large ring gears was the difficulty in presenting the tools to the work from such a far removed position when the ring gears were so large as to prevent putting the tool supporting devices sufficiently close to the work piece being machined for proper stability of the tools. This large ring gear construction also presented much greater expense in manufacture, particularly in instances where anti-friction bearings or other highly expensive bearings of large diameter were required. And also in cases where plain bearings were used in conjunction with these large ring gears the surface velocity of the bearing surfaces necessary to properly rotate the crankshaft at cutting speed were so high as to create serious problems of lubrication and wear in the bearings.

Also in the cases where the tailstocks are fixed and relatively large ring gears are utilized it was necessary after moving the crankshaft into the chucking devices to lower it to the chucking members and to raise it again after machining of the crankshaft before it was removed outwardly from the ring gear chuck. This resulted in considerable effort on the part of the operator especially when it was done manually. This also required considerable carefulness of operation on the part of the operator. There, loading devices were used, which loading devices were necessarily of elaborate construction to effect these various movements mechanically, the operator had to carefully actuate them in their proper sequence.

In instances where the tailstocks have been moved in the past the work was invariably loaded manually or by use of the usual cable and hook crane. Such loading and unloading was particularly difficult in instances where more than one center drive chuck was used because of the inability to properly hold the crankshaft when threading it through the chucking devices. The result was that the ring gears had to be made relatively large to permit the crank to be loaded manually without striking the chucking mechanism, and also, the cutting tools had to be withdrawn a relatively great distance from the axis of rotation of the chuck so that they would not be struck by the crankshaft when so loaded. This method obviously was very cumbersome and extremely difficult for the operator to perform consuming considerable time and energy on his part. Another defect of the above method was that there was no accurate way of guiding the crankshaft into and out of the chucking devices independent of the skill and effort exerted on the part of the operator.

In instances where the former type loading devices were used it was found that considerable effort was required on the part of the operator to roll the various loading cranes with the work hanging thereon into and out of the chucking devices commensurate with the high production required of these machines. With the structure here developed, this former effort was substantially reduced to a minimum while at the same time greatly reducing the amount of mental effort and skill necessary on the part of the operator in actuating the former loading devices in a definite sequential manner and in practically eliminating all costly loading devices.

Furthermore with these former methods including the former type loading devices, it was impossible to simultaneously load and unload the crankshafts from the chucks. It was necessary first to remove the finished work piece before a rough work piece was again loaded in the chuck whereas with the present method we are now able to simultaneously eject the completed crankshaft from the center drive chuck while loading an unmachined shaft therein. And furthermore in the former devices particularly where one device is utilized for loading and another for unloading of the work, it was necessary for the operator to move from one side of the machine to the other for operating the respective cranes which, of course, consumed time and effort on the part of the operator and cut down the productive output of the machine.

With these former difficulties clearly in mind, it is therefore an object of our invention to provide means for easily loading and unloading crankshafts in a center drive lathe on the axis of rotation of the center drive chucking devices and to provide means for ejecting said crankshafts from the chucking devices with a minimum of effort on the part of the operator.

Another object of our invention is to provide in a center drive lathe chucking devices adapted to engages a crankshaft by means of its rough irregular webs and to provide in conjunction with said chucking devices means, associated with the tool bars and tailstocks of said lathe, comprising a substantially continuous trough passing through the center drive chucks and past each of said tailstocks to form a substantially continuous trough upon which may be axially slid the crankshafts upon their rough webs for loading into and ejection from said center drive chucking devices.

Another object of our invention is to provide in a center drive lathe, means for supporting and rotating a crankshaft in the center drive chucks and means for stopping said center drive chucks at the completion of the cutting cycle at a predetermined indexed position relative to a loading and unloading arrangement comprising a trough forming a substantially continuous path from one end of the machine through the center drive chucks to the other end of the machine for loading and unloading crankshafts in said center drive lathe.

Another object of our invention is to provide in a center drive lathe having one or more center drive chucks and tailstocks each side of said center drive chucks, means for moving said tailstocks radially of the axis of rotation of said chucks and to provide means on each of said tailstocks comprising a loading and unloading trough, and means for actuating said tailstocks radially for presenting either their centers or the loading and unloading troughs in alignment with said chucking devices so that work may be supported at the ends or may be loaded or unloaded from said chucking devices when the centers of said tailstocks are withdrawn radially from aligned position with the center drive chucks.

It is also an object of our invention to provide in a center drive lathe one or more center drive chucks and associated tailstocks each side of said center drive chucks, both of said tailstocks being movable radially of the axis of rotation of the chucks and each incorporating a loading and unloading trough which may be brought in alignment with said chucking devices when the centers of said tailstocks are withdrawn radially from their work engaging position so that work may be loaded and unloaded from said center drive chucking devices by axially sliding said work with its axis substantially coinciding with the axis of rotation of said chuck.

And it is also an object of our invention to provide means for automatically moving the tailstock of a center drive lathe to present a loading trough in alignment with the center drive chucking devices at the completion of the machining operation and to present its work supporting center in alignment with the chucking devices during the cutting operation.

Further objects and advantages of our invention will appear from the detailed description of the drawings in which:

Figure I is a right hand end elevation of a double center drive crankshaft lathe showing one of the movable tailstocks with loading and unloading troughs and the associated center drive chucking device.

Figure II is a vertical transverse section through the lathe of Figure I on the line II—II of Figure III particularly showing the trough blocks on the tool bars and the construction of the center drive chucking devices associated with these blocks.

Figure III is a vertical section substantially on the line III—III of Figure I particularly showing the loading and unloading troughs on the tailstocks, the trough blocks on the tool bars and the gripping blocks in the center drive chucking devices.

Figure IV is a diagrammatic layout showing the relation of the various parts in the power transmission and driving motor for rotating the center drive ring gears of the lathe.

Figure V is a circuit and operating diagram showing the arrangement used when operating a tailstock with an unloading trough and a loading trough.

Figure VI is a diagrammatic layout of the operating and control mechanism utilized when operating a tailstock having a single loading and unloading trough.

Figure VII is a diagrammatic circuit layout and operating diagram showing mechanism utilized for effecting the accurate indexed stopping of the work spindle in a predetermined position in relation to the loading and unloading trough mechanism.

Figure VIII is a diagrammatic showing of the loading and unloading arrangement provided with one tailstock fixed and one movable, a finished work piece being shown in the chucking devices just at the completion of the machining operation and an unfinished work piece placed on the loading trough of the movable tailstock.

Figure IX is a diagrammatic showing similar to Figure VIII, but showing the movable tailstock position for moving finished work pieces from the chucking devices, the finished work piece being shown on the unloading trough and the unfinished work being shown on the loading trough.

Figure X is a diagrammatic showing similar to Figure VIII showing the movable tailstock positioned for inserting unfinished work pieces into the chucking devices, the unfinished work piece having been just loaded from the loading trough to the chucking devices and the finished work piece on the loading trough ready for removal from the lathe.

Figure XI is a diagrammatic showing of the loading and unloading arrangement provided with both tailstocks movable, the finished work piece being shown in the chucking devices just at the completion of the machining operation and an unfinished work piece placed on the loading trough of the right hand movable tailstock.

Figure XII is a diagrammatic showing similar to Figure XI, showing the tailstocks moved to loading and unloading position, with the unfinished work piece positioned ready for movement into the chucking devices and for ejecting the finished work piece therefrom.

Figure XIII is a diagrammatic showing similar to Figure XI, showing the position of the work pieces after the unfinished work piece has been inserted in the chucking devices.

The machine comprises a base 1 upon which are mounted the center drive chuck units 2 and 3 and the associated tool units 4, 5, and 6 in a manner as shown in Patent 2,069,107 dated January 26, 1937. In each of the center drive units 2 and 3 are rotatably mounted the center drive ring gears 7 on suitable anti-friction bearings 8 which gears are driven through idler gears 9 rotatably mounted on appropriate bearings in the center drive units by pinions 10 fixed on a drive shaft 11 journaled on appropriate bearings in the center drive units 2 and 3 and in the tool units 4 and 5. The drive shaft 11 projects from the left side of the tool unit 4 and has fixed on this end a gear 12 which is adapted to be driven by a pinion 13 fixed on the pulley shaft 14 which is suitably journaled in the tool units 4, 5, and 6. On the right hand side of the tool unit 6 is mounted the multiple V-belt driving pulley 15 which is adapted to be driven by a suitable electric motor 16 which has a driving pulley 17 fixed on its shaft 62 and is connected to the pulley by suitable V-belts 18.

In the tool units 4, 5, and 6 are slidably mounted the upper tool bars 19 and the lower tool bars 20. On the upper tool bars 19 are mounted the various cutting tools 21, 22, and 23 and on the lower tool bars 20 are mounted the cutting tools 24, 25, and 26, all of these tools being adapted to completely machine all of the line bearing portions 27, 28, and 29 and the flange end 30 and stub end 31 portions of a crankshaft W.

In each of the center drive ring gears 7 is provided chucking mechanism adapted to engage the crankshaft W to serve as the means for supporting and rotating said crankshaft in the lathe. This mechanism comprises a cartridge 32 fixed in the bore 33 of each of the ring gears 7 which is adapted to be positively driven by the key 34 and which has a central bore 35 for receiving the work W. To one side of the axis of rotation 35a of the chuck in the bore 35 are mounted the work engaging blocks 36 having the arcuate abutment surfaces 37 and 38 adapted to engage the rough periphery surfaces 43 of the webs 44 of the crankshaft W. Substantially diametrically opposite said blocks 36 on the other side of the axis 35a are arranged the work engaging blocks 39 in a clamp 40 and having the arcuate abutment surfaces 41 and 42 also adapted to engage the peripheral surfaces 43 of the crankshaft W. In order to properly bind the crankshaft W between these abutment blocks 36 and 39, the clamp 40, which is pivotally mounted in a socket 45 formed in the cartridge 32, is provided with a clamping eccentric 46 which is actuated by placing a wrench in the socket 47 to thereby force the sliding plunger 48 against the abutment block 49 fixed in the cartridge 32 to move the clamp counterclockwise, Figure II, toward the crankshaft W. A spring urged plunger 50 bearing against the surface 51 of the cartridge 32 provides means for automatically raising the clamp 40 from the work when the eccentric is loosened.

When loading and unloading the crankshafts W in the lathe the center drive ring gears 7 are preferably brought to a stop at a definite predetermined indexed position though this is not essential in instances where peripheral clamping surfaces are used on the crankshaft webs, since the work can be loaded or unloaded with equal facility when in any circular oriented position on the troughs in the chucking devices. The accurate stopping, however, is desirable to facilitate the operation of the clamping means in the chuck and is accomplished by the hydraulic braking motor 52 attached to the shaft 62 of the main driving motor 16 and the indexing plunger 53 which engages in the indexing disc 54 fixed to the gear 12 in a manner for example as fully disclosed and claimed in co-pending application Serial Number 209,026 filed May 20, 1938. This center drive ring gear stopping and positioning apparatus is best shown in Figure IV and VII. The supply of fluid pressure for this hydraulic control system may be derived from the hydraulic fluid pressure pump 55 driven by an electric motor 56 which draws fluid through the suction line 57 from the fluid reservoir 58 and delivers the fluid under pressure through the pressure line 59. Drainage from a relief valve in the pump 55 for maintaining pressure in the line 59 is exhausted through the line 60 into the drain line 61 which returns fluid to the reservoir 58.

In the operation of the lathe when the main drive motor 16 is operating driving the center drive gears 7 during the cutting operation, the hydraulic braking motor 52 is also being driven by the motor shaft 62. Under these conditions fluid is discharged from the exhaust port 63 of the braking motor 52 through the lines 64 and 65, passes freely through the relief valve 66, through the line 67, the solenoid operated control valve 68, which is normally spring set in neutral position at this time, into the line 69, and then through the line 70 back to the intake port 71 of the braking motor 52 to form a closed circuit for free circulation of fluid at large volume when the electric motor 16 is running at full speed offering no resistance to the rotation of the braking motor 52. Fluid from this closed circuit may not escape through lines 72 and 73 because of the check valve 74 which only permits flow of fluid from the line 75 to the line 73. Nor may fluid escape through the line 76 from line 72 since this latter line is at all times closed off at the control valve and serves only to supply fluid pressure for opening the valve 77 to connect line 78 to the drain line 61, which connection is normally cut off by the spring set arrangement in the valve when the pressure drops in the line 76.

High pressure is maintained in the closed circulating circuit by pressure received from the pressure line 59 which passes through the speed control valve 79 which in turn discharges the high pressure fluid into the line 80 connected to said circuit at a definite relatively small volume for at all times maintaining the high pressure in the circuit and to make up for any leakage from said circuit. This discharge from the valve 79 is also utilized to rotate the hydraulic braking motor 52 at a definite slow speed for driving the electric motor 16 and the center drive ring gears 7 at slow speed preparatory to stopping said gears or when jogging them as will be described. The relief valve 66, while it at all times allows free flow between the lines 65 and 67, is so set at a pressure higher than that of the relief valve in the pump 55, or in other words than the pressure in the closed circuit, that fluid does not escape under these conditions through the bypass line 81 and into the drain line 61.

Immediately upon disconnecting the electrical power from the motor 16 the limit switch LS—1 associated with the dog 83 on one of the ring gears 7 becomes effective through the usual relays and contactors (not shown) when engaged by said dog 83 to cause the solenoid B of the control valve 68 to be energized, operating the valve 68 so as to close off the line 69 and to connect line 67 to line 78. This causes the pressure to drop to substantially zero in the lines 70, 72, 73, and 75 because the intake volume through the port 71 of the braking motor 52, which is being driven at a high rate of speed by the momentum of the electric motor 16 and the associated driving transmission for the center drive gears 7, is far in excess of that which can be supplied by the valve 79 through the line 80. Dropping the pressure in the line 76 causes the valve 77 to operate by its spring to close off the line 78 thus preventing fluid from passing through the line 87. Extremely high pressure is momentarily built up in lines 64 and 65 until the momentum in the electric motor and spindle transmission is absorbed by bypassing fluid through the high pressure relief valve 66 into the line 81. The discharge through the line 81 passes through the line 75, through the check valve 74, and into the line 73 due to the suction action set up in the lines 73, 72, and 70 by the rapid intake of the hydraulic braking motor 52. The check valve 82, which is arranged to prevent flow from the drain line 61 to line 75, maintains the suction action through the check valve 74.

The hydraulic braking motor 52 will continue to decelerate in bypassing fluid through the valve 66 until it has slowed down to a point where the volume taken into the intake port 71 is equal to that being supplied through the line 80 from the valve 79. The valve 66 is so set as to effect the deceleration to this point by the time the work spindle has made about a half revolution of the work spindle or ring gears 7. After the hydraulic braking motor 52 has decelerated to the above point pressure again builds up in the lines 70, 72, 73, and 76 and the braking motor 52 is driven at a relatively slow speed for similarly rotating the work spindle by fluid from the line 80. Building up pressure in the line 76 again opens the valve 77 connecting line 78 to the drain line 61, allowing free flow of fluid through line 67 thus eliminating all back pressure at the exhaust port 63 of the braking motor 52 which would hinder the operation of said motor 52 at the predetermined slow speed.

As soon as the limit switch LS—1 is operated the limit switch LS—2 is then rendered in a condition to be effective when operated. The limit switch LS—2 is operated when the dog 84 carried on one of the ring gears 7 engages it as the work spindle is rotated at the predetermined slow speed by the hydraulic braking motor 52. Operation of the limit switch LS—2, through appropriate relays and contactors (not shown), causes the solenoid C of the control valve 87 to be energized to operate the valve 87 so as to connect the fluid pressure line 59 to the line 88 to cause the indexing plunger 53 connected to the piston 89 in the cylinder 90 to be urged against the indexing disc 54. Exhaust fluid from the cylinder 90 under these conditions passes through line 91, the valve 87, and into the drain line 61. The dog 84 is arranged to operate the limit switch LS—2 just prior to the time when the notch in the indexing disc 54 is in position for engagement by the indexing plunger 53. Thus the plunger 53 bears against the periphery of the indexing disc after limit switch LS—2 has operated, the plunger jumping into the slot as the spindle transmission is rotated at slow speed by the braking motor 52 to instantly arrest rotation of the ring gears 7 and stop them in accurate predetermined indexed position.

The solenoid D of the valve 87 is adapted to be energized to connect the pressure line 59 to the line 91 and line 88 to the drain line 61 for withdrawing the indexing plunger 53 from the indexing disc 54 whenever the main driving motor 16 is energized. In order to prevent damage to the machine in the event the indexing plunger 53 would be inserted in the disc 54 before the spindle transmission had completely decelerated to the slow speed, a pressure controlled limit switch LS—3 is connected in series with the limit switch LS—2 and is operated by pressure in the lines 64 and 65 through its connecting line 92 so as to render the limit switch LS—2 inoperative so long as there is pressure in the lines 64 and 65 during deceleration of the lathe transmission, the pressure dropping to substantially zero in these lines to allow the limit switch LS—3 and LS—2 to operate only when the braking motor 52 has completely decelerated and is being driven at the predetermined slow speed from the hydraulic pump 55 as described.

On each of the tool bars 20 are mounted the trough blocks 93, 94, and 95 by suitable bolts 96 passing through clearance hole 97 in said blocks and threaded in the tool bars. These blocks have arcuate guide surfaces 98 which are arranged to be in alignment with the respective surfaces 37 and 38 of the blocks 36 in the ring gears 7 when the ring gears are stopped in indexed position and the tool bars 19 and 20 are in fully retracted position. Any variation of the retracted position of the tool bars 20 in setting the cutting tools 24, 25, and 26 for properly sizing the work may be compensated for by loosening the bolts 96 and moving the blocks 93, 94, and 95 on the tool bar 20 to bring their surfaces 98 in proper alignment with the blocks 36 in the center drive chucks.

On the base 1 of the lathe each side of the center drive chuck units and tool units are mounted the automatically operated tailstocks 100 and 101. Since the construction and operation of these tailstocks is substantially alike, a description of the one tailstock 101 will suffice for both. Noting particularly Figures I and III, the tailstock 101 is slidably mounted on dovetail guideways 102 on the support 103 fixed on the base 1 by bolts 104 for movement perpendicular to the axis of rotation of the center drive ring gears 7. A hydraulic cylinder 105 mounted in a bracket 106 fixed to the base 1 having its piston 107 and associated piston rod 108 connected to the tailstock 101 serves to reciprocate the tailstock 101 on the dovetail guideways 102. Mounted in the tailstock 101 is the tailstock barrel 109 having the usual center 110 adapted to move parallel with the axis of rotation 35a of the center drive gear 7. This barrel 109 is axially reciprocated by a pinion 111 engaging a rack 112 formed on the barrel and fixed on a rock shaft 113 journaled against axial movement in appropriate bearings 114 in the tailstock 101. The outwardly projecting portion of the rock shaft 113 has splines 115 which slidingly engage in the splined bore of the pinion 116 journaled against axial movement in the bracket 106. Mounted on the bracket 106 is a hydraulic cylinder 117 having a piston 118 and an associated piston rod 119 having rack teeth formed thereon engaging the pinion 116 whereby fluid pressure actuation of the cylinder 117 effects movement of the tailstock barrel 109. In connection with this barrel 109 is a clamp 118a for locking the barrel in position when its center 110 is engaged with the end of the crankshaft W. This clamp 118a is pivotally mounted on a pin 119a fixed in the tailstock and extends over the barrel 109 with an arcuate bearing surface 120 slidingly engaging said barrel when unclamped. To the opposite side of the barrel 109 from the pin 119a is attached the tension bolts 121 which have squared heads 122 slidingly engaging appropriate slots 123 in the clamping plate 124 (for movement with the tailstock 101) pivotally mounted on a pin 125 fixed in the support 103. Adjusting nuts 126 on the bolts 121 provide means for properly adjusting the clamping force of the clamp 118a against the barrel 109. A hydraulically actuated plunger 127 connected to the piston 128 in the cylinder 129 formed in the support 103 serves to actuate the clamp plate 124 and the bolts 121 to effect clamping of the tailstock barrel by the clamp 118a.

Mounted on the tailstock 101 and movable therewith are loading and unloading troughs 130 and 131 having the arcuate work supporting surfaces 132 adapted to receive crankshaft W. By moving the tailstock by appropriately actuating the cylinder 105 as will be described, the tailstock barrel and its center may be positioned coaxial with or removed from the axis 35a of said center drive chucks and one or the other of the troughs 130 and 131 may be positioned so as to be in alignment with the chucks and the trough blocks 93, 94, and 95 on the tool bars 20 when the chucks are stopped. When so positioned either of the troughs 130 or 131 and the blocks in the chucks and on the tool bars form a substantially continuous arcuate trough from the tailstocks past the cutting tools and through the center drive chucks upon which work crankshafts W may be slid axially into and out of loading position in the chucking devices of the lathe. To load a crankshaft W in the lathe it is merely necessary to place the crankshaft in one of the properly positioned troughs 130 or 131 and push the crankshaft axially into the center drive chucks and tighten the clamping eccentrics 46, no other manipulations being necessary before starting the cutting operation. At the completion of the cutting operation the clamping eccentrics 46 are loosened and the crankshaft W slid axially out on one of the properly aligned troughs 130 or 131.

There are various methods of operating this loading and unloading arrangement. One method would be to at all times have the tailstock 100 and its center 110 fixed and to insert and remove the crankshaft W from the right hand side of the machine. In conjunction with this arrangement either one loading trough 130 or both loading troughs 130 and 131 may be utilized in connection with the tailstock 101. When a single trough 130 is used the rough crankshafts W are placed on the trough and loaded into the chuck and the finished crankshafts are slid out on the same trough and removed therefrom. This is a very satisfactory arrangement where the maximum saving in loading and unloading time is off-set by the lesser amount of equipment required in this arrangement. Where further savings are desired in the loading and unloading time when loading from one side only of the machine two loading troughs 130 and 131 are provided on the tailstock 101 upon one of which is placed the rough crankshafts W and the other to receive finished crankshafts W as they come out of the center drive chucks. Thus in this set up the rough crankshafts can be placed on one trough 131 and finished crankshafts removed from the other trough 130 while the machine is going through its cutting cycle.

Still another way of operating this arrangement is to have both tailstocks 100 and 101 movable and to provide a loading trough for each tailstock. In this instance the trough 130 of the tailstock 100 received the finished crankshafts while the rough crankshafts are placed on the trough 130. A unique feature in connection with this set up is that the operator may remain at one side of the machine while loading crankshafts in the lathe, it being unnecessary for him to go to the other side of the machine to unload the finished work. In operation both tailstocks withdraw from work holding position when the cutting cycle has been completed bringing their respective loading troughs 130 in alignment with the chucks. The rough crankshaft W, which has previously been placed in the trough 130, for example of tailstock 101, is pushed axially to the left engaging the finished crankshaft lying unchucked in the center drive gears 7 whereby the finished crankshaft is ejected out of the gears and onto the trough 130 of the tailstock 100 as the rough crankshaft is brought into chucking position. The trough 130 on the tailstock 100 may be so constructed that as further crankshafts are passed into, machined, and ejected from the machine the finished crankshafts will automatically drop from this trough onto a suitable conveyor to be carried thereby to subsequent operations to be performed on the crankshafts. Thus with this method of operation the operator need only load rough crankshafts into the chucks and operate the clamping mechanism in the chucks. The number of times the operator must handle the crankshafts per given output of the machine is thus enormously reduced and it is also found that much less effort is required to simultaneously slide two crankshafts in this loading and unloading arrangement than is required to operate a pair of loading devices as shown in Patent 2,069,107 dated January 26, 1937.

The operation and control mechanism for actuating the tailstock with one loading and unloading rail is shown in Figure VI. The control lever 134 for effecting the various sequential operations of the tailstock 100 or 101 has a shaft 135 upon which are mounted suitable actuating cams 136 and 137 for effecting operation of the control valves 138 and 139 as will be described. When the control lever 134 is in the "clamp" position valve 138 is so actuated by the cam 136 that fluid pressure from the pump 55 passes through line 140, the valve 138, through line 141, and into the head end of the cylinder 129 to force its piston 128 and rod 127 against the clamping plate 124 to clamp the barrel 109 in the tailstock 101 when in work engaging position. Drainage from the rod end of the cylinder under these conditions returns through line 142, the valve 138 and into the drain line 61 to the reservoir 58.

After the work W has been machined the control lever is moved from the "clamp" position to the "unclamp" position whereupon valve 138 is delivered to line 142 to retract the piston 128 and rod 127 of the cylinder 129 from the clamping plate 124 to unclamp the barrel 109 from the tailstock 101, drainage from the head end of the cylinder 129 under these conditions returning through line 141, through the valve 138, into the drain line 61.

After having unclamped the tailstock barrel 109 the control lever 134 is then moved to "load" position whereupon fluid pressure from the line 140 passes through the valve 139, the line 143, freely through the bypass valve 144, through the line 145 into the cylinder 117 to effect withdrawal of the barrel 109 from work engaging position, drainage from the cylinder 117 under these conditions passes through the lines 146, freely through the pressure reducing valve 147, the line 148, freely through the bypass valve 149 into the line 150, and through the valve 139 into the drain line 61. After the cylinder 117 has affected complete withdrawal of the barrel 109 and its piston and rod has stalled against a suitable stop, pressure builds up in the lines 143 and 145 causing fluid to bypass through the valve 144, through the line 151 into the head end of the cylinder 105 moving its piston 107 and rod 108 to move the tailstock 101 and its barrel 109 from alignment with the axis of the center drive chucks and to bring the loading and unloading rail 130 into alignment with the center drive chucks. While the piston 107 is being so actuated fluid is being discharged from the cylinder 105 through the line 152, freely through the valve 149, through the line 150, the valve 39, and into the drain line 61. After the piston 107 has completed this movement the machine is then in condition to unload the finished work piece and load a rough piece preparatory to beginning another cutting cycle.

When the rough work piece W has been loaded in the center drive chucks the control lever is moved from the "load" position to the "normal" position whereupon fluid pressure from the line 140 passes through the line 150, freely through the valve 149, through the line 152 into the rod end of the cylinder 105 thus moving the tailstock 101 and its barrel 109 into alignment with the axis of the center drive chucks. Under these conditions fluid is expelled from the head end of the cylinder 105 through the line 151, freely passing through the valve 144 into the line 143 and then through the valve 139 into the drain line. As soon as the tailstock 101 has moved to said aligned position the piston 107 stalled by suitable abutment means, pressure builds up in the lines 152 and 150 discharging fluid through the valve 149 into line 148 and through the pressure reducing valve 147 is delivered into line 146 at a predetermined lower pressure for actuating the cylinder 117 to insert the center 110 of the barrel 109 in the tailstock 101 just the right pressure to engage the work without distorting it. Discharge from the cylinder 117 is carried by the line 145, freely through the valve 144, into the line 143 and through the valve 139 into the drain line 61. The work is then clamped in the chucking devices and the control lever 134 moved to "clamp" position to secure the tailstock barrel 109 as described. In cases where both tailstocks 100 and 101 are arranged to move, one of the tailstocks would be moved to work engaging position and its barrel clamped with its center engaging the work to properly axially position said work in the lathe by providing means for accurately stopping the position of the barrel 109 of this tailstock 100 before it is clamped. The tailstock 101 is then brought to work engaging position as described.

In instances where an unloading trough 130 and a loading trough 131 are utilized in conjunction with the tailstock 101 an operating circuit as shown in Figure V is utilized. The method of clamping and unclamping the tailstock barrel 109 is the same as described in Figure VI. The control lever 134 is provided with an "unload" position as well as a "load" position as in Figure VI. When in the "unload" position the unloading rail 130 is aligned with the center drive chucks and when in the "load" position the rail 131 is aligned with the chucks. When the control lever 134 is in the "unload" position fluid pressure from the line 140 passes through the valve assembly 153 into the line 143, passing freely through the valve 144 into the line 145 connected to the cylinder 117 to retract the barrel 109 from work engaging position at the completion of which movement fluid is bypassed through line 151 into the head end of the cylinder 105 moving its piston 107 and rod 108 to retract the tailstock from aligned position to the unloading position. During this movement fluid is discharged from the rod end of the cylinder 105 through the line 152, the valve 149, line 150, and the valve assembly 153 into the drain line 61 and also through the line 154 connected to an annular groove 155 formed midway the length of the bore of the cylinder 105 and connected through the valve assembly 153 with the drain line 61. The piston 107 continues to move past this annular groove 155 until it is exposed to connection with the head end chamber of the cylinder at which time pressure from the line 151 can escape through the line 154 thus allowing the piston to come to a stop to thus bring the unloading trough 130 in alignment with the center drive chucks.

When the control lever 134 is moved to "load" position the valve assembly 153 is actuated to close off the line 154 to again build up pressure in the head end chamber of the cylinder 105 received from the line 151 to cause the piston 107 to complete its stroke to bring the loading trough 131 in aligned position with said chucks.

After the work has been appropriately loaded in the machine the control lever is moved to the "normal" position whereupon fluid pressure is delivered to the cylinders 105 and 117 and fluid exhausted therefrom in a manner as described in Figure VI, the line 154 being closed off and ineffective during this operation.

Having thus fully set forth and described our invention what we claim and desire to secure by United States Letters Patent is:

1. In a lathe, one or more rotatable center drive chucks, means for rotating said chucks, means for stopping said chucks, cutting tools associated with said chucks, tailstocks associated with said chucks, having centers and loading and unloading troughs incorporated therein, and means for moving said tailstocks relative to said chucks for alternately presenting said centers and said troughs in alignment with said chucks.

2. In a lathe, one or more rotatable center drive chucks, means for rotating said chucks, means for stopping said chucks in a definite predetermined position, cutting tools associated with said chucks, tailstocks associated with said chucks having centers and loading and unloading troughs incorporated therein, and means for moving said tailstocks relative to said chucks for presenting said centers in alignment with said chucks when said cutting tools are operating on a work piece in the chucks and for presenting said loading and unloading troughs in alignment with the chucks when said chucks are stopped for loading and unloading work from said chucks.

3. In a lathe, a rotatable center drive chuck, means for rotating said chuck, means for stopping said chuck in a predetermined position, a tailstock associated with said chuck, a center and a loading and unloading trough incorporated in said tailstock, means for moving said tailstock relative to the axis of rotation of said chuck for alternately bringing said center or said trough in alignment with said chuck.

4. In a lathe, a rotatable center drive chuck, means for rotating said chuck, means for stopping rotation of said chuck in a predetermined position, a tailstock associated with said chuck, a center, a loading trough, and an unloading trough incorporated in said tailstock, means for moving said tailstock relative to the axis of rotation of said chuck, for bringing either of said troughs or said center in alignment with said chuck.

5. In a lathe, a rotatable center drive chuck, means for rotating said chuck, means for stopping said chuck in a predetermined position, a tailstock each side of said chuck, a center and a loading trough incorporated in each of said tailstocks, means for moving said tailstocks relative to the axis of rotation of said chuck for alternately bringing said centers or said troughs in alignment with said chuck.

6. In a lathe, a rotatable center drive chuck, means for rotating said chuck, means for stopping said chuck in a predetermined position, a tailstock each side of said chuck, a loading and unloading trough associated with one of said tailstocks, and means for moving said last mentioned tailstock relative to the axis of rotation of said chuck for alternately bringing its center or its trough in alignment with said chuck.

7. In a lathe, a rotatable center drive chuck, means for rotating said chuck, means for stopping said chuck in a predetermined position, a tailstock each side of said chuck, a loading trough, an unloading trough, and a center associated with one of said tailstocks, and means for moving said last mentioned tailstock relative to the axis of rotation of said chuck for alternately bringing either of its troughs or said center in alignment with said chuck.

8. In a lathe, a rotatable center drive chuck, means for rotating said chuck, means for stopping said chuck in a predetermined position, work engaging surfaces in said chuck adapted to engage rough, irregular surfaces on a work piece to be machined in said lathe, a tailstock associated with said chuck, a center in said tailstock, a loading and unloading trough mounted on said tailstock, and means for moving said tailstock relative to said chuck for bringing said center in engagement with the end of said work piece in the chuck or one of said troughs in alignment with the work engaging surfaces in said chuck when stopped in said predetermined position.

9. In a lathe, a rotatable center drive chuck, means for rotating said chuck, means for stopping said chuck in a predetermined position, work engaging surfaces in said chuck adapted to engage rough, irregular surfaces on a work piece to be machined in said lathe, tool feeding devices associated with said chuck, trough blocks on said tool feeding devices adapted to be aligned with said work engaging surfaces in said chuck when said chuck is stopped and said tool feeding devices are withdrawn from said work piece, said surfaces thus forming a substantially continuous trough through said chuck and past said tool feeding devices in which may be axially slid said work piece on its rough irregular surfaces into or out of said chucking device.

10. In a lathe, a rotatable center drive chuck, means for rotating said chuck, means for stopping said chuck in a predetermined position, work engaging surfaces in said chuck adapted to engage rough, irregular surfaces on a work piece to be machined in said lathe, tool feeding devices associated with said chuck, surfaces on said tool feeding devices adapted to be aligned with said surfaces in said chuck when said chuck is stopped and said tool feeding devices are withdrawn from said work piece, tailstocks associated with said chuck and tool feeding devices, a center and a loading and unloading trough associated with said tailstocks, and means for moving said tailstocks so as to bring said troughs in alignment with said surfaces of the chuck and tool feeding devices to form a substantially continuous trough through said chuck and past said tool feeding devices and tailstocks in which may be axially slid said work piece on its rough irregular surfaces into and out of said chucking devices.

11. In a lathe, a rotatable center drive chuck, means for rotating said chuck, means for stopping said chuck in a predetermined position, work engaging surfaces in said chuck adapted to engage rough, irregular surfaces on a work piece to be machined in said lathe, tailstocks associated with said chuck, surfaces on said tailstocks adapted to be aligned with said surfaces in said chuck when said chuck is stopped and the centers of said tailstocks are removed from said work piece, said surfaces thus forming a substantially continuous trough through said chuck and past said tailstocks in which may be axially slid said work piece on its rough, irregular surfaces into or out of said chucking device.

12. In a lathe, a rotatable center drive chuck, means for rotating said chuck, means for stopping said chuck in a predetermined position, work engaging surfaces in said chuck adapted to engage rough irregular surfaces on a work piece to be machined in said lathe, tool slides operable each side of said chuck, cutting tools mounted on said slides, trough blocks mounted on said slides having surfaces adapted to be aligned with said surfaces in said chuck when said tools are retracted from said work piece and said chucks are stopped and means for adjusting said blocks relative to said tool slides.

13. In a lathe, a pair of rotatable center drive chucks, means for rotating said chucks in synchronism, means for stopping said chucks in a predetermined position, work engaging surfaces in said chucks adapted to engage rough irregular surfaces on a work piece to be machined in said lathe, tool slides operable each side of and between said chucks, cutting tools mounted on said slides, and trough blocks mounted on said slides having surfaces adapted to be aligned with said surfaces in said chucks when said tools are retracted from said work piece to thus form a substantially continuous trough for guiding said work pieces into or out of said chucks and past said cutting tools.

14. In a lathe, a tailstock movable relative to the spindle axis of said lathe, an axially movable center in said tailstock, means for clamping said center against axial movement when engaged with a work piece in said lathe, a loading and unloading trough mounted on said tailstock, means for axially withdrawing said center from said work piece, and means for moving said tailstock to remove said center from aligned position with said spindle axis and to bring said trough in alignment therewith to facilitate loading or unloading said work piece on said axis.

15. In a device for loading and unloading rough irregular work pieces in a machine tool, a loading and unloading trough associated with a chucking device of said machine tool adapted to engage rough irregular surfaces on said work pieces to be machined so that said work pieces may be slid axially on said rough irregular surfaces in said loading and unloading trough into or out of said chucking device, and means in said chucking device for gripping said work piece by means of said rough irregular surfaces thereon.

16. In a device for loading and unloading rough irregular work pieces in a machine tool, a loading and unloading trough associated with a chucking device of said machine tool adapted to engage rough irregular surfaces on said work pieces to be machined so that said work pieces may be slid axially on said rough irregular surfaces in said loading and unloading trough into or out of said chucking device, means for positioning said chucking device in a predetermined position relative to said trough, and means in said chucking device for gripping said work piece by means of said surfaces.

17. In a device for loading and unloading rough irregular work pieces in a center drive lathe, a loading and unloading trough associated with a chucking device of said lathe adapted to carry a work piece by means of its rough irregular surfaces so that said work pieces may be moved axially on said rough surfaces in said loading and unloading trough into or out of the center drive chucking device of said lathe, and means in said chucking device for gripping said work pieces by means of said rough irregular surfaces.

18. In a device for loading and unloading rough irregular work pieces in a center drive lathe, a loading trough associated with a center drive chucking device of said lathe adapted to engage rough irregular surfaces on said work pieces to be machined, so that said work pieces may be moved axially on said surfaces in said loading trough into the center drive chucking device, means in said chucking device for gripping said work pieces by means of said rough irregular surfaces, an unloading trough associated with said chucking device, adapted to engage the rough irregular surfaces of said work pieces when it is moved out of said chucking device after the completion of said machining.

19. In a device for loading and unloading rough irregular work pieces in a center drive lathe, a loading trough located to one side of a center drive chucking device of said lathe, adapted to engage rough irregular surfaces on said work pieces to be machined so that said work pieces may be moved axially on said surfaces in said loading trough into said center drive chucking device, means in said chucking device for gripping said work pieces by means of said surfaces, and an unloading trough located on the other side of said chucking device adapted to engage the rough irregular surfaces on the work pieces when they are moved out of said chucking device after the completion of said machining.

20. In a loading and unloading mechanism for a center drive crankshaft lathe, a loading trough associated with a center drive chucking device of said lathe adapted to engage rough irregular surfaces on webs of a crankshaft to be machined, so that said crankshaft may be moved axially on said surfaces in said loading trough into the center drive chucking device, means in said chucking device for gripping said crankshaft by means of said surfaces, and an unloading trough associated with said chucking device adapted to engage said surfaces on the webs of said crankshaft when it is moved out of said chucking device after the completion of said machining.

21. In a loading and unloading mechanism for a center drive crankshaft lathe, a loading trough located to one side of a center drive chucking device of said lathe, adapted to engage rough irregular surfaces on webs of a crankshaft to be machined, so that said crankshaft may be axially moved on said surfaces in said loading trough into the center drive chucking device, means in said chucking device for gripping said crankshaft by means of said surfaces, and an unloading trough located at the other side of said chucking device adapted to engage said rough irregular surfaces on the crankshaft when it is moved out of said chucking device after the completion of said machining.

22. In a loading and unloading mechanism for a center drive crankshaft lathe, a loading trough arranged to be positioned in alignment with the center drive chuck of said lathe adapted to engage rough irregular surfaces of webs of a crankshaft to be machined, so that said crankshaft may be moved axially on said surfaces in said loading trough into said chuck, means in said chucking device for gripping said crankshaft by means of said surfaces, and an unloading trough arranged to be positioned in alignment with the center drive chuck to engage said rough irregular surfaces on the crankshaft when it is moved out of said chucking device, after the completion of said machining.

23. In a loading and unloading mechanism for a center drive crankshaft lathe, means for positioning a loading trough in alignment with a chucking device of said lathe, a crankshaft having rough irregular webs adapted to be placed in said trough on said webs and moved into said chucking device, means in said chucking device for gripping said crankshaft by means of said rough irregular webs and means for positioning an unloading trough in alignment with said chucking device to receive said crankshaft when machined as it is ejected from said chucking device by moving further unmachined crankshafts from said loading trough into said chucking device.

24. In a loading and unloading mechanism for a center drive crankshaft lathe, a center drive chuck having means adapted to grip a crankshaft by means of rough irregular surfaces thereon, and means for simultaneously removing a finished crankshaft and inserting a rough crankshaft in said chuck comprising means on one side of and aligned with said chuck for presenting an unfinished crankshaft by means of said rough irregular surfaces for movement into said chuck, and means on the other side of and aligned with said chuck, to receive a finished crankshaft as it is ejected from said chuck on said rough irregular surfaces by the movement of unfinished crankshafts while engaged with said finished crankshafts in the chuck from said first mentioned means into said chuck.

25. In a loading and unloading mechanism for a center drive crankshaft lathe, a center drive chuck having means adapted to grip a crankshaft by means of rough irregular surfaces thereon, means each side of said chuck and aligned with said gripping means of said chuck adapted to permit sliding of unmachined crankshafts axially of said chuck on said rough surfaces to engage finished crankshafts gripped in said chuck, said means permitting continued axial movement of said unfinished crankshafts into said chuck to thereby simultaneously eject said finished crankshafts as said unfinished crankshafts are brought into said chuck.

26. In a device for loading and unloading work pieces in a center drive lathe chucking device, a loading and unloading trough, associated with said chucking device, adapted to carry a work piece so that it may be moved axially in said loading and unloading trough into or out of said center drive chucking device, and means in said chucking device for gripping said work piece.

27. In a device for loading and unloading work pieces in a chucking device of a machine tool, a loading and unloading trough, associated with said chucking device, adapted to engage said work pieces to be machined so that they may be slid axially in said loading and unloading trough into or out of said chucking device, and means in said chucking device for gripping said work piece.

28. In a loading and unloading mechanism for a chucking device of a center drive crankshaft lathe, a loading trough, located to one side of said center drive chucking device, adapted to engage webs of a crankshaft to be machined, so that said crankshaft may be moved axially on said webs in said loading trough into said center drive chucking device, and means in said chucking device for gripping said crankshaft by means of its webs.

29. In a loading and unloading mechanism for a chucking device for a center drive crankshaft lathe, a loading trough, located to one side of said center drive chucking device, adapted to engage webs of a crankshaft to be machined, so that said crankshaft may be moved axially on said webs in said loading trough into said center drive chucking device, and means in said chucking device for gripping said crankshaft by means of its webs, and an unloading trough, located at the other side of said chucking device, adapted to engage said webs on the crankshaft when it is moved out of said chucking device after the completion of the machining operation.

WILLIAM F. GROENE.
WALTER R. MEYER.